(12) United States Patent
Hirano et al.

(10) Patent No.: US 9,813,901 B2
(45) Date of Patent: Nov. 7, 2017

(54) COMMUNICATION SYSTEM, COMMUNICATION METHOD, NETWORK SIDE COMMUNICATION DEVICE AND COMMUNICATION TERMINAL

(75) Inventors: Jun Hirano, Kanagawa (JP); Takashi Aramaki, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 497 days.

(21) Appl. No.: 13/125,229

(22) PCT Filed: Oct. 21, 2009

(86) PCT No.: PCT/JP2009/005528
§ 371 (c)(1),
(2), (4) Date: Apr. 20, 2011

(87) PCT Pub. No.: WO2010/047107
PCT Pub. Date: Apr. 29, 2010

(65) Prior Publication Data
US 2011/0199981 A1   Aug. 18, 2011

(30) Foreign Application Priority Data
Oct. 22, 2008   (JP) .................................. 2008-272029

(51) Int. Cl.
*H04W 4/00* (2009.01)
*H04W 8/26* (2009.01)
(Continued)

(52) U.S. Cl.
CPC ......... *H04W 8/26* (2013.01); *H04L 29/12245* (2013.01); *H04L 29/12301* (2013.01);
(Continued)

(58) Field of Classification Search
CPC ......... H04L 29/12245; H04L 29/12952; H04L 61/203; H04L 61/6077
(Continued)

(56) References Cited

U.S. PATENT DOCUMENTS 5,996,016 A * 11/1999 Thalheimer ............. H04L 12/24
709/203
6,587,457 B1 * 7/2003 Mikkonen ...................... 370/356
(Continued)

FOREIGN PATENT DOCUMENTS

EP        1113629 A2 *  7/2001  ......... H04L 12/5695
JP        2005-45472       2/2005
(Continued)

OTHER PUBLICATIONS

3GPP TS 23.402 V8.0.0, "3rd Generation Partnership Project; Technical Specification Group Services and System Aspects; Architecture enhancements for non-3GPP accesses (Release 8)," Dec. 2007, pp. 1-131, p. 3, Line 5.
(Continued)

*Primary Examiner* — Derrick Ferris
*Assistant Examiner* — Farhad Ali
(74) *Attorney, Agent, or Firm* — Dickinson Wright

(57) ABSTRACT

Disclosed is a technique for performing flexible service-level access control in real-time while suppressing occurrence of signaling. According to the technique, a network entity (AAA server 10) configured to perform access control sets correspondences between addresses of a communication terminal (UE) 40 and respective service contents of services that the communication terminal 40 receives, and notifies the communication terminal of the correspondences. Thus, the communication terminal is able to know the service contents corresponding to the addresses that the communication terminal uses. In a case where a service
(Continued)

content of a service that the communication terminal receives is changed, the address used by the communication terminal is changed to an address corresponding to the changed service content. As a result, from the changed address, the communication terminal is able to know that the service content has been changed and to know the changed service content.

22 Claims, 6 Drawing Sheets

(51) Int. Cl.
    *H04L 29/12*     (2006.01)
    *H04L 29/06*     (2006.01)
    *H04W 12/08*     (2009.01)
    *H04W 48/08*     (2009.01)
    *H04W 80/04*     (2009.01)
    *H04W 88/06*     (2009.01)

(52) U.S. Cl.
    CPC ...... *H04L 29/12952* (2013.01); *H04L 61/203* (2013.01); *H04L 61/2076* (2013.01); *H04L 61/6077* (2013.01); *H04L 63/0892* (2013.01); *H04W 12/08* (2013.01); *H04W 48/08* (2013.01); *H04W 80/04* (2013.01); *H04W 88/06* (2013.01)

(58) Field of Classification Search
    USPC .......................................................... 370/328
    See application file for complete search history.

(56) References Cited

U.S. PATENT DOCUMENTS

| | | | |
|---|---|---|---|
| 2001/0036164 A1* | 11/2001 | Kakemizu et al. ........... | 370/331 |
| 2002/0065907 A1* | 5/2002 | Cloonan ............. | H04L 12/2801 709/223 |
| 2005/0041671 A1 | 2/2005 | Ikeda | |
| 2006/0002344 A1* | 1/2006 | Ono et al. ..................... | 370/331 |
| 2006/0129630 A1* | 6/2006 | Catalina-Gallego et al. | 709/203 |
| 2006/0218298 A1* | 9/2006 | Knapp et al. .................. | 709/238 |
| 2007/0124592 A1* | 5/2007 | Oyama .......................... | 713/171 |
| 2007/0286117 A1* | 12/2007 | Balasubramanian et al. ............................. | 370/328 |
| 2008/0037478 A1* | 2/2008 | Na et al. ........................ | 370/338 |
| 2008/0137615 A1* | 6/2008 | Park et al. ..................... | 370/332 |
| 2008/0207206 A1* | 8/2008 | Taniuchi et al. ............... | 455/436 |
| 2008/0273520 A1* | 11/2008 | Kim et al. ..................... | 370/345 |
| 2009/0061869 A1* | 3/2009 | Bui et al. .................... | 455/435.1 |
| 2009/0092099 A1* | 4/2009 | Gu et al. ....................... | 370/331 |
| 2009/0122756 A1* | 5/2009 | Gu et al. ........................ | 370/329 |
| 2009/0161624 A1* | 6/2009 | Johnson et al. ............... | 370/331 |
| 2009/0196231 A1* | 8/2009 | Giaretta et al. ............... | 370/328 |
| 2009/0232019 A1* | 9/2009 | Gupta ................... | H04L 12/287 370/252 |
| 2009/0303881 A1* | 12/2009 | Tsirtsis et al. ................ | 370/235 |
| 2009/0305701 A1* | 12/2009 | Giaretta et al. ............ | 455/435.1 |
| 2009/0310381 A1* | 12/2009 | Chang et al. .................. | 362/555 |
| 2009/0310495 A1* | 12/2009 | Seta et al. ...................... | 370/252 |
| 2010/0039936 A1* | 2/2010 | Jin et al. ........................ | 370/230 |
| 2011/0013614 A1* | 1/2011 | Chen ............................. | 370/338 |
| 2011/0228744 A1* | 9/2011 | Cai et al. ....................... | 370/331 |
| 2012/0042029 A1* | 2/2012 | Tuvell et al. .................. | 709/206 |

FOREIGN PATENT DOCUMENTS

| | | |
|---|---|---|
| JP | 2008-55320 | 8/2008 |
| JP | 2008-187597 | 8/2008 |

OTHER PUBLICATIONS

S. Gundavelli, et al., "Proxy Mobile IPv6" IETF Internet Draft draft-ietf-netlmm-proxymip6-00.txt, Apr. 8, 2007, pp. 1-46, p. 3, Line 6.
D. Johnson, et al., "Mobility Support in IPv6," IETF RFC 3775, Jun. 2004, pp. 1-165, p. 3, Line 8.
3GPP TS 22.011 V8.4.1, "3rd Generation Partnership Project; Technical Specification Group Services and System Aspects; Service accessibility (Release 8)," Jun. 2008, pp. 1-25, p. 3, Line 10.
Japanese Office Action dated Nov. 5, 2013.

* cited by examiner

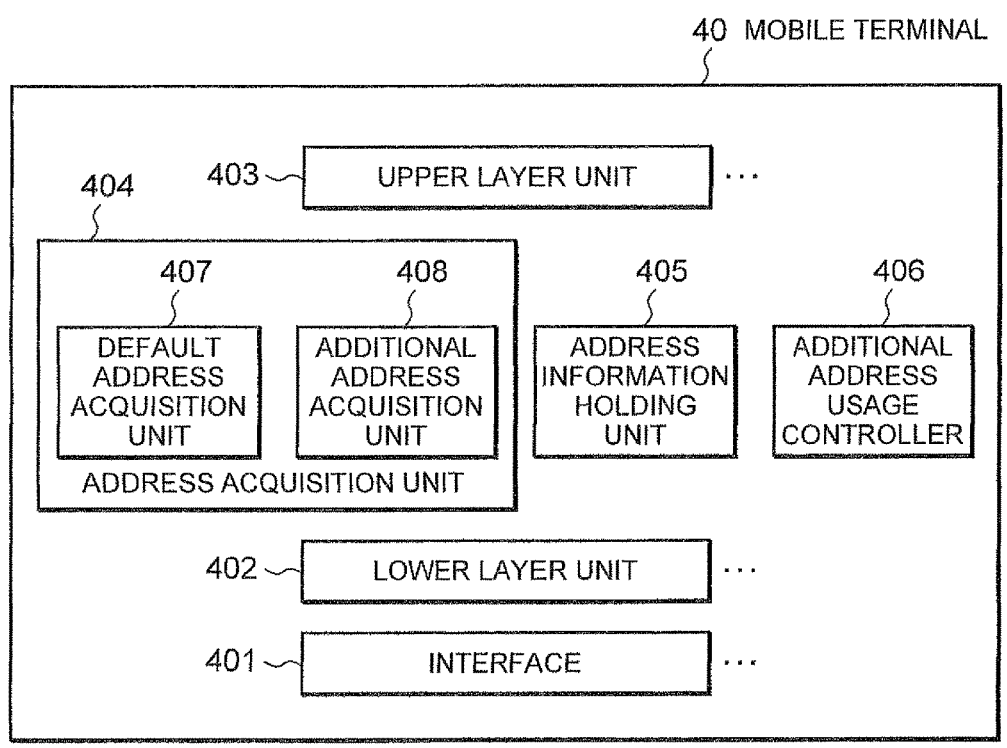
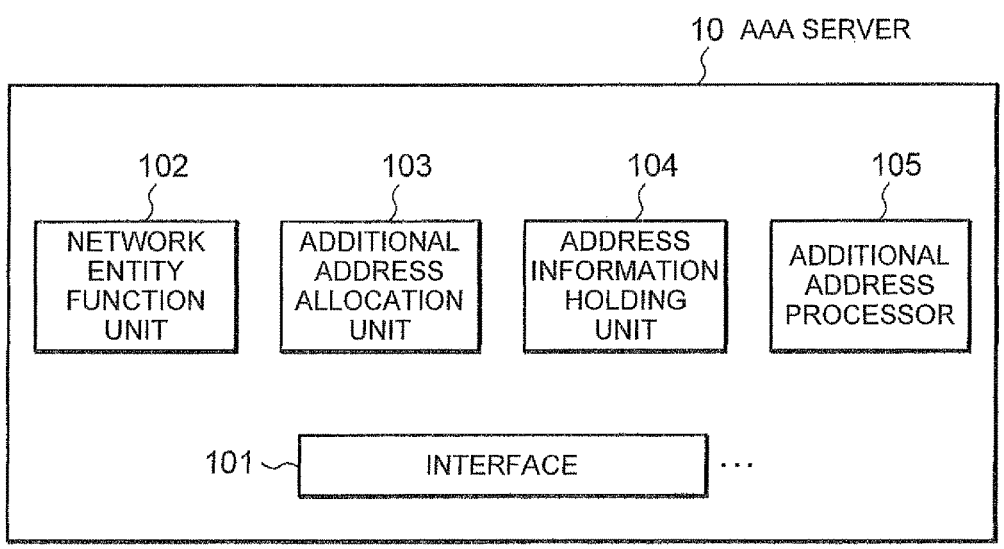

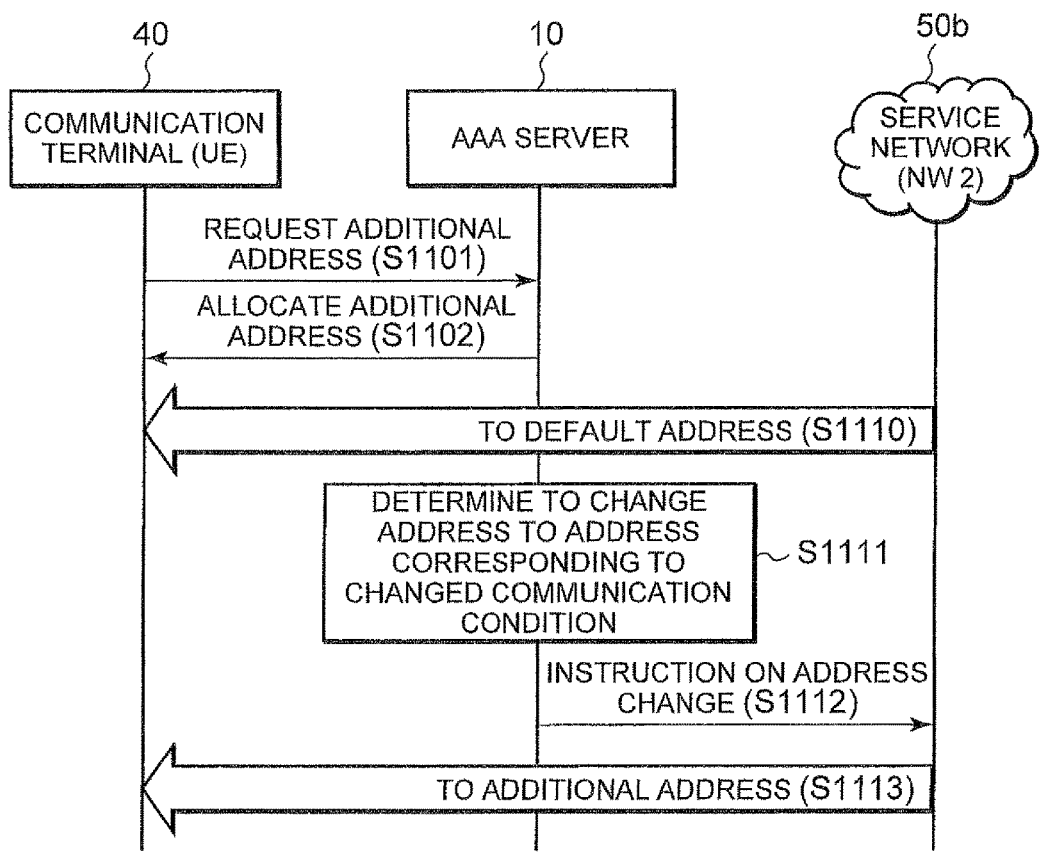

COMMUNICATION SYSTEM, COMMUNICATION METHOD, NETWORK SIDE COMMUNICATION DEVICE AND COMMUNICATION TERMINAL

TECHNICAL FIELD

The present invention relates to a communication technique in a packet-switched data communication network, and particularly to a communication technique for access control on a communication terminal (UE: User Equipment) at service level (stage of receiving actual service after connecting to a network).

BACKGROUND ART

Currently, there is a system which has functions of a radio communication such as cellular communication where a single base station covers a mid to long-distance service area, functions of a WLAN (Local Area Network) with a relatively short-distance service area; and the like. The system provides a communication service through a network formed of multiple different types of networks. There is also a radio communication terminal which is connectable to these networks.

Concerning such a network formed of multiple different types of networks, the 3GPP (Third Generation Partnership Project) discusses radio communication terminals and related communication techniques, the radio communication terminal having functions to communicate with various types of networks such as a cellular network (3GPP network), a WiMAX (Worldwide Interoperability for Microwave Access) type WWAN (Wireless Wide Area Network), a WLAN and the like.

Discussions are made particularly for the purposes such as enabling such different types of networks to achieve seamless mobility and to support multiple application services requiring high QoS (Quality of Service), such as real-time video, VoIP (Voice over Internet Protocol) and important data.

For example, later-mentioned Non-Patent Document 1 discloses a technique for allocating an address when a radio communication terminal moves into and connects to a non-3G network. Use of PMIPv6 (Proxy Mobile IPv6) disclosed in later-mentioned Non-Patent Document 2 is considered for such mobility management in a 3G/non-3G network.

In PMIPv6, a function on the network side supports local mobility. However, there may be situations where the radio communication terminal itself performs mobility management for some reason, such as a case where a network does not support PMIPv6 or where a certain necessity arises in connecting with the correspondent terminal. In this case, the radio communication terminal can perform its own mobility management by using MIPv6 (Mobility Support in IPv6) described in later-mentioned Non-Patent Document 3, for example.

Note that in such a situation, regardless of the number of interfaces in each terminal, multiple addresses may be allocated to a single radio communication terminal due to various factors such as service, connection destination, and state of connection to a roaming network. Moreover, although a radio communication terminal may have multiple location registration nodes in some cases depending on the state of roaming or the like, the radio communication terminal does not recognize the difference among the nodes in most of the cases.

In addition, in a 3GPP network, network access control is performed so as to suit the usage or capability of a radio communication terminal, to cope with load control on the network side, and for other purposes. As a method for such access control, a function of limiting connection to a base station by using SIM (Subscriber Identity Module) information and an access class value which is set for each radio communication terminal, as described in later-mentioned Non-Patent Document 4 is used to allow only specific radio communication terminals, or to enable group-based connectable timing control by forming groups of radio communication terminals satisfying certain conditions (or groups selected at random). Moreover, service-level access control performs management of individual radio communication terminals by using AAA (Authentication, Authorization and Accounting).

PRIOR ART DOCUMENT

Non-Patent Document

Non-patent document 1: 3GPP TS 23.402 V8.0.0, December, 2007

Non-patent document 2: IETF (Internet Engineering Task Force) Draft: draft-ietf-netlmm-proxymip6-00.txt, April, 2007

Non-patent document 3: IETF RFC (Request for Comments): RFC3775, June, 2004

Non-patent document 4: 3GPP TS 22.011 V8.4.1, June, 2008

However, after communication terminals are allowed to access a network, service-level access authorization is usually granted for individual communication terminals and individual services to be provided. Accordingly, if a network entity decides that, when a failure or congestion occurs in the network, it is necessary to perform real-time processing including limitation on the communication terminals to be provided with a service, change to another service (load balancing, limit on function (upper limit of usage) or preferential use), and other similar processing, the entity needs to perform some kind of access control even on communication terminals which have already completed access and received the service. Moreover, communication terminals having completed access respectively have different combinations of states (authentication, charging, right to receive a service, quality of required service and the like). Thus, suitable access control needs to be performed individually for the communication terminals.

For this reason, in a case of changing a content of a service provided to each of communication terminals having completed access and received the service, there is a problem that signaling to each of the communication terminals is performed by the network side. Meanwhile, in a case of changing a content of a service provided to each of communication terminals having completed access and received the service without performing notification by signaling from the network side, there is a problem that signaling of inquiries and signaling requesting the service before the change is performed by each of the communication terminals.

Hereinafter, an example of the problems to be solved by the present invention will be described specifically with reference to FIG. 8. FIG. 8 shows a network entity (an AAA server 1001 in this example) configured to perform access control and multiple routing entities 1002. Note that in the case of PMIPv6, for example, the routing entities 1002 shown in FIG. 8 are an LMA (Local Mobility Anchor), an MAG (Mobile Access Gateway), and the like. In addition, multiple communication terminals (UE) 1004 connect to a base station 1003 and receive a content distribution service from a service network 1005 (also called PDN: Packet Data Network; service NW 1, for example in FIG. 8), for example. Note that although FIG. 8 shows an example of a case where each communication terminal 1004 is a radio communication terminal that connects to the network through radio communication with the base station 1003, the communication terminal 1004 may use any of radio communication and wired communication as means for connecting to the network.

In such a state, the network entity (the AAA server 1001 in this example) configured to perform access control limits use by a specific communication terminal 1004 connected to a specific base station 1003 to ease network congestion, for example. In this case, the AAA server 1001 may notify the individual target communication terminal 1004 of the use limitation (and way of use limitation). Otherwise, the AAA server 1001 may stop provision of or downgrade (lowering the service quality such as setting a smaller communication bandwidth) the service to the specific communication terminal 1004 without transmitting a notification to the terminal 1004.

In the method of individually notifying the communication terminals 1004 of a change in the content of a service provided to the communication terminals 1004, a different change notification needs to be transmitted to each of the target communication terminals 1004. This causes problems such as an increase in the load on the entity (the AAA server 1001) for transmitting the notification, and further worsened congestion due to traffic caused by an increase in signaling for the notification. There is also a problem that the signaling for notification itself may not reach the communication terminal 1004 because of the network congestion.

Meanwhile, in the method of not notifying the communication terminals 1004 of a change in the content of a service provided to the communication terminals 1004, each communication terminal 1004 receives no notification on the status change and thus may make an inquiry, perform retransmission, transmit an NAck (Negative Acknowledge) to the network side, or start recovery processing (such as a service search or the re-requesting of a service) due to an error state (time out, for example) of the communication terminal 1004. Hence, this method also causes problems such as giving an adverse effect on the network congestion, and an increase in the load on the communication terminal 1004.

SUMMARY OF THE INVENTION

To solve the above problems, the present invention aims to provide a communication system, a communication method, a network side communication device, and a communication terminal for performing flexible service-level access control in real-time while suppressing occurrence of signaling.

In order to achieve the above objective, a communication system according to the present invention is a communication system including: a communication terminal connecting to a network; and a network side communication device configured to perform access control of the communication terminal. In the communication system: the network side communication device includes an information holding unit configured to hold pieces of correspondence information between respective service contents of a plurality of different services and pieces of identification information of the communication terminal, and an identification information processor configured to determine a service content of a service to be used by the communication terminal, and set a piece of identification information to be used by the communication terminal from among the pieces of identification information corresponding to the determined service content by referring to the pieces of correspondence information; and the communication terminal includes an information holding unit configured to hold the pieces of correspondence information notified by the network side communication device.

This configuration allows performing flexible service-level access control in real-time while suppressing occurrence of signaling.

Further, in order to achieve the above objective, in a communication method according to the present invention, pieces of identification information of a communication terminal are set to correspond to respective service contents of a plurality of different services; the communication terminal knows a service content corresponding to a piece of identification information used by the communication terminal; and according to a service content of a service to be used by the communication terminal, a piece of identification information to be used by the communication terminal is selectively set from among the pieces of identification information corresponding to the service contents of the plurality of different services.

This allows performing flexible service-level access control in real-time while suppressing occurrence of signaling.

Further, in order to achieve the above objective, a network side communication device according to the present invention is a network side communication device installed in a network to which a communication terminal is connectable, the network side communication device including: means for holding pieces of identification information of the communication terminal corresponding to respective service contents of a plurality of different services, and the service contents corresponding to the pieces of identification information; and means for changing a piece of identification information used by the communication terminal to a piece of identification information corresponding to a service content of a service which is to be used by the communication terminal and determined according to a change in a communication state.

This configuration allows performing flexible service-level access control in real-time while suppressing occurrence of signaling.

Further, in order to achieve the above objective, a communication terminal according to the present invention is a communication terminal connectable to a network including: means for holding pieces of identification information of the communication terminal corresponding to respective service contents of a plurality of different services, and the service contents corresponding to the pieces of identification information; and means for changing a piece of identification information used by the communication terminal to a piece of identification information corresponding to a service content of a service which is to be used by the communication terminal and determined according to a change in a communication state.

This configuration allows performing flexible service-level access control in real-time while suppressing occurrence of signaling.

The present invention has the above configuration, and has an effect of performing flexible service-level access control in real-time while suppressing occurrence of signaling.

BRIEF DESCRIPTION OF THE DRAWINGS

FIG. 2 A diagram showing an exemplary configuration of a communication terminal 40 in the first embodiment of the present invention.

FIG. 3 A diagram showing an exemplary configuration of an AAA server 10 in the first embodiment of the present invention.

FIG. 4 A sequence chart showing an exemplary operation performed in the first embodiment of the present invention.

FIG. 5 A table showing an example of service contents associated with addresses allocated to a communication terminal in the first embodiment of the present invention.

DESCRIPTION OF EMBODIMENTS

Hereinafter, a description will be given of embodiments of the present invention with reference to the drawings.

In the present invention, addresses of a communication terminal are set so that the addresses correspond to service contents (usages) of multiple different services. Moreover, the communication terminal itself knows the service contents corresponding to the respective pieces of identification information (such as addresses of the communication terminal), and the piece of identification information to be used by the communication terminal is selectively set from among the pieces of identification information corresponding to the service contents of the multiple different services, depending on the service content of the service to be used by the communication terminal.

Note that the network side may selectively set the piece of identification information to be used by the communication terminal, or the communication terminal itself may selectively set the piece of identification information to be used by the communication terminal. In addition, the piece of identification information to be used by the communication terminal may be set according to a change in the communication state measurable on the network side, or may be set according to a change in the communication state measurable by the communication terminal. Moreover, service contents of the respective services can be classified by types of services and/or qualities of services, and the pieces of identification information of the communication terminal can be set to correspond to the types of services and/or the qualities of services.

Hereinafter, description will be given of embodiments of the present invention by describing an embodiment based on a basic concept of the present invention (first embodiment), and an embodiment explaining a specific example of a case where a communication terminal travels (second embodiment).

<First Embodiment>

Figure 1:
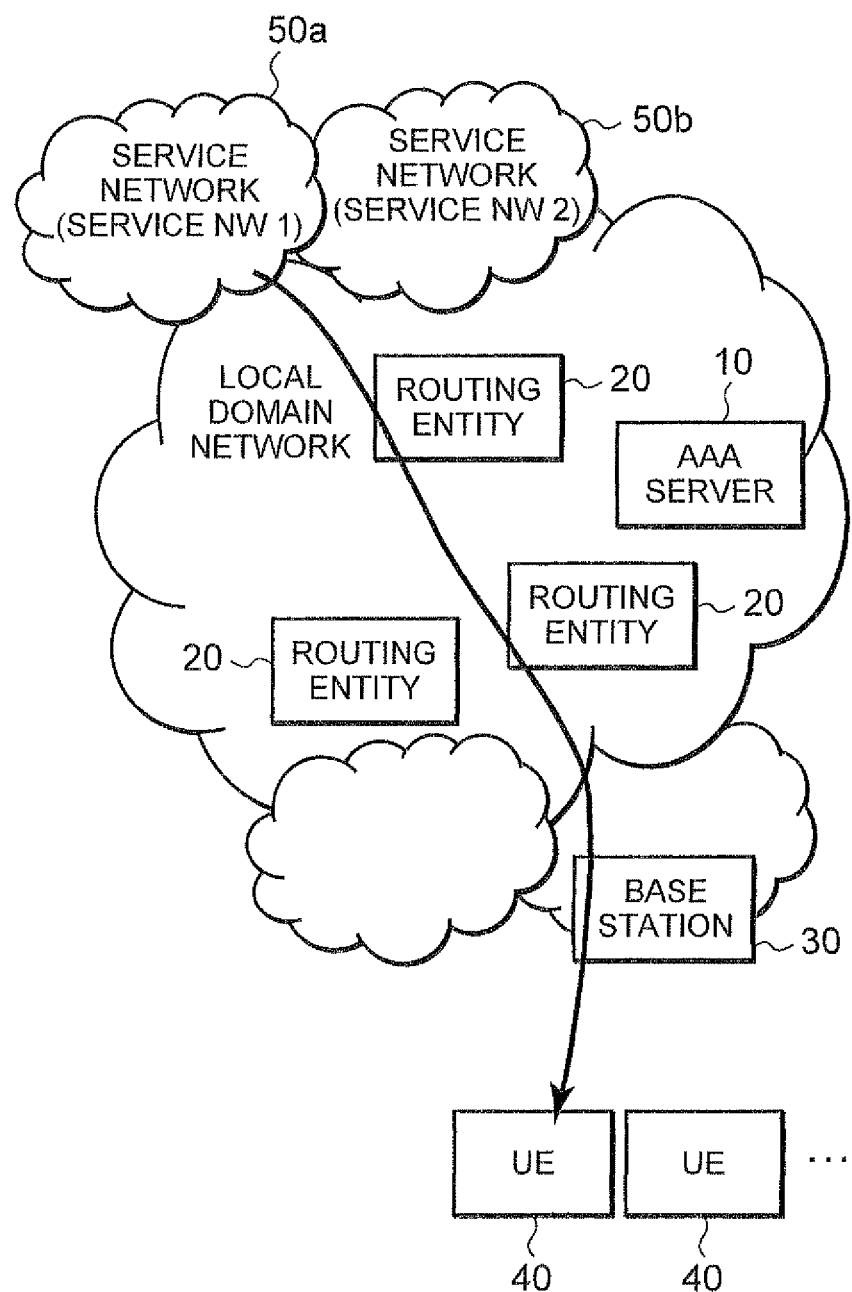
FIG. 1 A diagram showing an exemplary configuration of a network system in a first embodiment of the present invention.

To begin with, the first embodiment of the present invention will be described. Firstly, a description will be given of a configuration of a network system in the first embodiment of the present invention. FIG. 1 is a diagram showing an exemplary configuration of the network system in the first embodiment of the present invention.

FIG. 1 shows an entity configured to perform access control (an AAA server 10 in this example) inside a network (local network domain), and multiple routing entities 20. Note that in the case of PMIPv6, for example, the routing entities 20 shown in FIG. 1 are an LMA, an MAG, and the like. In addition, multiple communication terminals (UE) 40 connect to a base station 30 and receive a content distribution service from a service network (service NW 1) 50a, for example. Note that FIG. 1 shows only two of service networks which may otherwise be three or more, and such service networks are denoted as the service network (service NW 1) 50a and a service network (service NW 2) 50b. Moreover, although FIG. 1 shows an example of a case where each communication terminal 40 is a radio communication terminal that connects to the network through radio communication with the base station 30, the communication terminal 40 may use any of radio communication and wired communication as means for connecting to the network.

The AAA server 10 is a network entity configured to perform access control, and is capable of controlling service-level access by the communication terminal 40, according to the network state and a state of the communication terminal 40. Note that whether or not a content of a service to be provided to the communication terminal 40 needs to be changed in real-time, may be decided by the AAA server 10 or otherwise by another routing entity 20.

Meanwhile, each routing entity 20 is a network entity configured to transfer data packets in the network. Note that although the name and detailed functions differ depending on the network configurations, a basic function of the routing entity 20 is to transfer data packets to the communication terminal 40. In addition, the base station 30 provides network access to the communication terminal 40, and may also serve as a routing entity in some cases.

Meanwhile, the communication terminal 40 receives a service from each of the service network (service NW 1) 50a and the service network (service NW 2) 50b. Here, the communication terminal 40 subscribes to the service network (service NW 1) 50a as a normal subscriber (subscribing with a normal fee, for example), and subscribes to the service network (service NW 2) 50b as a premium subscriber (paying extra fee, for example). Note that generally, the communication terminals 40 individually subscribe to the respective service networks. In other words, generally, the communication terminals 40 individually make different subscriptions to different (or the same) service networks.

Next, a configuration of the communication terminal 40 will be described. FIG. 2 is a diagram showing an exemplary configuration of the communication terminal 40 in the first embodiment of the present invention.

In FIG. 2, the communication terminal 40 includes one or multiple interfaces 401, lower layer units 402, and upper layer units 403 configured to perform processing on services provided to the communication terminal 40.

Note that each interface 401 may have a radio communication function for performing communication through radio transmission, and may have a wired communication function for performing communication through wired transmission. In addition, the functions and configurations of the lower layer unit 402 and the upper layer unit 403 are the same as those in a normal communication terminal 40.

The communication terminal 40 also includes an address acquisition unit 404, an address information holding unit 405, and an additional address usage controller 406. The address acquisition unit 404 further includes a default address acquisition unit 407 and an additional address acquisition unit 408.

The default address acquisition unit 407 of the address acquisition unit 404 has a function of acquiring a normal address (default address) by performing a conventional address acquisition procedure. Meanwhile, the additional address acquisition unit 408 of the address acquisition unit 404 has a function of acquiring an additional address different from the default address (such as later-mentioned alternative address and address for emergency hotline) by using the conventional address acquisition procedure.

Meanwhile, the address information holding unit 405 has a function of holding an additional address in addition to the conventional function of holding a default address. As shown in later-described FIG. 5, for example, the address information holding unit 405 is capable of holding multiple addresses and usages (service contents) corresponding to the addresses. Note that an additional address is preferably held in association with a corresponding default address.

Meanwhile, the additional address usage controller 406 has a function of: using an additional address that suits a specific purpose of the communication terminal 40; performing processing on a packet that reaches the additional address; changing packet processing settings in response to an address change; notifying the lower layer unit 402 or the upper layer unit 403 of information; and the like.

The additional address usage controller 406 has a function of changing the piece of identification information being used by the communication terminal 40 to a piece of identification information corresponding to the service content of the service which is to be used by the communication terminal 40 and determined according to a change in the communication state. Further, the additional address usage controller 406 itself may determine the service content of the service to be used by the communication terminal 40 according to a change in the communication state, or otherwise, a network entity may acquire (know) the service content of the service which is to be used by the communication terminal 40 and determined according to a change in the communication state. Alternatively, the communication terminal 40 itself may detect a change in the communication state by measuring the communication state, or otherwise, may acquire (know) a change in the communication state which is detected by a network entity.

Next, a configuration of the AAA server 10 will be described. FIG. 3 is a diagram showing an exemplary configuration of the AAA server 10 in the first embodiment of the present invention. Note that although in this example the AAA server 10 is cited as an example of a network entity configured to perform access control, in a case where a network entity configured to perform access control is implemented by another communication device, the main configuration of FIG. 3 may be employed in the device implementing the network entity configured to perform access control.

The AAA server 10 shown in FIG. 3 includes, in addition to one or multiple interfaces 101, a network entity function unit 102, an additional address allocation unit 103, an address information holding unit 104, and an additional address processor 105.

The network entity function unit 102 has a function of a conventional network entity. For example, in a case where the network entity configured to perform access control is the AAA server 10, the network entity function unit 102 has a function of implementing the AAA server.

Meanwhile, the additional address allocation unit 103 has a function of allocating, to each communication terminal 40, additional addresses which can be used depending on assumable states. Note that the additional address allocation unit 103 may newly generate an additional address and allocate it to each communication terminal 40, or set a usage for an address already held by each communication terminal 40, the usage indicating a specific state at which the address should be used.

In addition, the additional address allocation unit 103 is capable of notifying each communication terminal 40 of the usage (service content) set for the additional address allocated to the communication terminal 40. Moreover, the additional address allocation unit 103 may allocate a default address to each communication terminal 40, or may set a usage of the default address for the address (default address) allocated to each communication terminal 40 and notify each communication terminal 40 of the usage. Note that the notification of the address usage may be performed directly by the AAA server 10 to the communication terminal 40, or may be performed via another entity in the network. Furthermore, the AAA server 10 (or another entity in the network) may notify the communication terminal 40 of the address usage in response to an inquiry made by the communication terminal 40.

Meanwhile, the address information holding unit 104 has a function of holding an additional address in addition to the default address allocated to each communication terminal 40. As shown in later-described FIG. 5, for example, the address information holding unit 104 is capable of holding multiple addresses and usages (service contents) corresponding to the addresses. Note that an additional address of each communication terminal 40 is preferably held in association with the default address of the communication terminal 40.

Meanwhile, the additional address processor 105 has a function of: processing a packet for a specific purpose coming from the communication terminal 40; performing access control according to a change in the network state to select an additional address suitable for the communication terminal 40 corresponding to the access control or change the additional address for use; and the like, The additional address processor 105 has a function of changing the piece of identification information being used by the communication terminal 40 to a piece of identification information corresponding to the service content of the service which is to be used by the communication terminal 40 and determined according to a change in the communication state. Further, the additional address processor 105 itself may determine the service content of the service to be used by the communication terminal 40 according to a change in the communication state, or otherwise, another network entity or the communication terminal 40 may acquire (know) the service content of the service which is to be used by the communication terminal 40 and determined according to a change in the communication state. Alternatively, the network entity (AAA server 10) configured to perform access control itself may detect a change in the communication state by measuring the communication state, or otherwise, may acquire (know) a change in the communication state which is detected by another network entity or the communication terminal 40.

Next, an operation in the first embodiment of the present invention will be described. FIG. 4 is a sequence chart showing an exemplary operation performed in the first embodiment of the present invention.

(Operation for Acquiring Additional Address)

In FIG. 4, in a case of requesting an additional address at the time of address allocation, for example, the communication terminal 40 acquires default addresses (above-mentioned address A1 and address B1) after completing authentication for network access, and then the additional address acquisition unit 408 of the communication terminal 40 requests an additional address corresponding to its subscription rank (step S1101). Note that the request for additional address need not be made simultaneously with acquisition of the default address, and may be made at any timing.

The additional address allocation unit 103 of the network entity (AAA server 10) configured to perform access control allocates to the communication terminal 40: an address A2 (an address having a limited bandwidth, for example) as an additional address in the service network (service NW 1) 50*a*; an address B2 (an address through which a service of a quality equivalent to using a default address can be obtained, for example) as an additional address in the service network (service NW 2) 50*b*; and/or an address B3 (an address for preferentially-controlled communication, for example) (step S1102). Note that at this time, usages (service contents) of the additional addresses are preferably notified to the communication terminal 40 together with the addresses, or if not, the usages corresponding to the addresses may be set and notified after the additional addresses are allocated to the communication terminal 40.

The communication terminal 40 holds the allocated addresses in the address information holding unit 405, and receives a normal service (such as a content distribution service from the service network (NW 1) 50*a*) by use of a default address (step S1110). Moreover, the network entity (AAA server 10) configured to perform access control similarly holds the addresses allocated to the communication terminal 40 in the address information holding unit 104.

Here, usages (service contents) associated with the addresses allocated to the communication terminal 40 will be described. FIG. 5 is a table showing an example of service contents associated with addresses allocated to a communication terminal in the first embodiment of the present invention.

As has been described, the communication terminal 40 acquires a main address A1 (default address) for normal use in the service network (service NW 1) 50*a*. In addition, the communication terminal 40 additionally acquires an address A2 as an alternative address in the service network (service NW 1) 50*a*. Since the communication terminal 40 subscribes to the service network (service NW 1) 50*a* as a normal subscriber, the address A2 being an additional address is an address which provides a downgraded service (accompanied by a forcible handover to another access network, an upper limit being set for a QoS parameter, having a possibility of being disconnected after a predetermined period, and so forth) at the time of a network failure. Hence, using the address A2, the communication terminal 40 receives a service of a lower service quality (such as a limited bandwidth) than a service received by using the address A1. Note that if there is a limitation when using the address A2, it is preferable that the limitation when using the address A2 be shared in advance between the network side and the communication terminal 40. For example, the network side may notify, at the time of allocating the address, the communication terminal 40 of the limitation in using the address A2, or a configuration of the address itself may be defined to represent a specific usage.

In the meantime, the communication terminal 40 acquires a main address B1 (default address) for normal use in the service network (service NW 2) 50*b*. In addition, the communication terminal 40 additionally acquires an address B2 as an alternative address in the service network (service NW 2) 50*b*. Since the communication terminal 40 subscribes to the service network (service NW 2) 50*b* as a premium subscriber, the address B2 is an address which provides a service having stable quality even at the time of a network failure (quality being stable as a result of preferential control of some kind, for example). Hence, using the address B2, the communication terminal 40 can receive a service of the same quality as a service received by using the address B1.

Note that although by using the address B2 the communication terminal 40 can receive a service of the same quality as a service received by using the address B1, the case of using the address B2 is where a network failure occurs, for example. For this reason, some kind of limitation may be set (such as being unable to request an additional service) even if a service of a stable quality is provided from the network side. Note that if there is such a limitation in using the address B2, it is preferable that the limitation in using the address B2 be shared in advance between the network side and the communication terminal 40. For example, the network side may notify, at the time of allocating the address, the communication terminal 40 of the limitation in using the address B2, or a configuration of the address itself may be defined to represent a specific usage.

In addition, the communication terminal 40 additionally acquires an address B3 as an emergency-inquiry address. The address B3 is used to preferentially notify the communication terminal 40 of information on the network side or used by a routing entity to transfer an inquiry from the communication terminal 40 to a network entity in a preferential manner. Examples of such situations include a case of notifying that it has become difficult to maintain a service even by using the address B2, or a case of presenting an alternative access network. Note that a different address is preferably allocated as the address B3 so that notification of information by use of the address B3 can be handled separately from a session providing a service.

Moreover, an additional address may otherwise be used as an address for using a service with a higher priority. For example, a preferential address that can be used by the communication terminal 40 at any time point even when there is no network failure may be acquired as an additional address. This additional address, for example, may have a larger upper limit of communication bandwidth than normal, and preferential communication can be performed by using the additional address. Such a function may be used for a case of offering a normal subscriber to become a premium subscriber by giving him/her an address by which a service for premium subscribers can be temporarily (for a limited period, for example) received.

Note that whether or not a service is handled with priority may be set not according to a contract condition of each user, but according to the type of used service (service type). Here, service types are classified from viewpoints of routing such as normal/preferential, charging, and difference in purpose of data communication such as data/voice. For example, a VoIP (voice) service is one of important services for the communication terminal 40, and is a service which requires continuous isochronous transmission. For this reason, an additional alternative address may be prepared to preferentially maintain the VoIP service even when the network state changes. Thus, alternative addresses may be prepared according to conditions and backgrounds specific to services, such as an address for a data upload service (amount of data to be transmitted from the communication terminal 40 to the network side is large), an address for a popular content (repeatedly accessed during a certain period), and the like.

Both the network entity (AAA server 10) configured to perform access control and the communication terminal 40 hold, in the respective address information holding units 104, 406, correspondences between addresses of the communication terminal 40 and service contents thereof as shown in FIG. 5 (not limited to the form shown in FIG. 5). Moreover, it is preferable that the network entity (AAA server 10) hold address correspondences related to each of multiple different communication terminals 40. It is also preferable that the additional addresses (address A2 for address A1, address B2 and address B3 for address B1) be managed in association with the default addresses (address A1 and address B1).

Note that the communication terminal 40 may specify, at the time of requesting an additional address, a usage of an address that the communication terminal 40 requires. For example, in the above example, the communication terminal 40 may specify and request an address for emergency hotline in the service network (service NW 2) 50*b* as an additional address. In this case, the network entity (AAA server 10) configured to perform access control may allocate to the communication terminal 40 only the address for emergency hotline (aforementioned address B3) as an additional address, or may allocate to the communication terminal 40 other additional addresses together with the address for emergency hotline (aforementioned address B3) so that at least the address for emergency hotline (aforementioned address B3) is included as an additional address. Moreover, even if the communication terminal 40 does not make a request for an additional address, the network entity (AAA server 10) configured to perform access control may allocate an additional address to the communication terminal 40 according to need.

In FIG. 5, usages (service contents) corresponding to the respective addresses are shown in the form of explanations. However, the usages can be expressed as predetermined bit arrays defined to correspond to the respective usages, for example. These bit arrays can be used to report usages corresponding to the respective addresses, or to store the usages corresponding to the respective addresses.

(Operation when Communication State Changes)

In the aforementioned state where usages (service contents) are set for the respective addresses allocated to the communication terminal 40, suppose that there arises a need to lower the bandwidth that the communication terminal 40 uses in the service network (service NW 1) 50*a* due to a change in the communication state on the network side.

At this time, the additional address processor 105 of the AAA server 10 determines, based on the situation requiring lowering of the bandwidth (changed communication state), to change the address to an address corresponding to the lower bandwidth, and selects the corresponding address (step S1111). For example, if addresses are allocated to the communication terminal 40 as shown in FIG. 5, the additional address processor of the AAA server 10 selects the address A2 as the address to be used by the communication terminal 40 instead of the address A1. A notification including an instruction to change to the address A2 is transmitted to an entity in the service network (service NW 1) 50*a* according to need (step S1112), and the destination address of a packet to be transmitted from the service network (service NW 2) 50*a* to the communication terminal 40 is set to the address A2 (step S1113).

Detecting that the session of the service network (service NW 1) 50*a* which has earlier been addressed to the address A1 is changed to be addressed to the address A2 (detecting that the address of a received packet of the session of the service network (service NW 1) 50*a* is changed from the address A1 to the address A2, for example), the additional address usage controller 406 of the communication terminal 40 changes packet processing settings according to the lowered bandwidth, notifies the lower layer block and the upper layer block of the information, and performs processing so that the packets whose destination addresses are changed to the address A2 are handled as packets from the service network (service NW 1) 50*a*. At this time, the communication terminal 40 knows the usage (service content) corresponding to the address A2, and thus can cope with the address change without making an inquiry or the like to the network side.

Note that as the changes in the communication state which cause an address change, various change parameters are conceivable such as bandwidth, jitter, delay time, maximum packet size, which routing entities to pass through, and the like. Accordingly, it is preferable that multiple addresses be prepared as alternative addresses, the addresses corresponding to the respective communication states. Moreover, the degree of change, too, is preferably divided into multiple steps. In other words, it is preferable that an alternative address be prepared depending on the level of each communication state and the level of service to be provided. Thus, the communication terminal 40 can make more appropriate transmission and reception settings (such as a buffer size).

In addition to making an emergency inquiry or notification, an additional address for preferentially-controlled communication can be used for preferentially transferring various service requests/notifications. For example, if the communication terminal 40 desires to urgently request additional communication resources from a session of a service that the communication terminal 40 already uses, the additional address usage controller 406 of the communication terminal 40 performs control to transmit the request by using the address B3. The AAA server 10 makes a notification that a packet having the address B3 as its transmission source should be transferred preferentially in a routing entity or be handled as a packet to be preferentially subjected to processing in a service network, and the like. Hence, the request from the communication terminal 40 is subjected to processing in a faster and preferential manner than other request conditions from other communication terminals 40.

In addition, in step S1111 in FIG. 4 described above, a change in the communication state that the network entity (AAA server 10) configured to perform access control refers to in determining the address change may be measured and detected by the network entity (AAA server 10) configured to perform access control by itself. Otherwise, the network entity (AAA server 10) configured to perform access control may acquire information on a change in the communication state which is measured and detected by another network entity. Alternatively, the communication terminal 40 may measure and detect a change in the communication state and notify the network entity (AAA server 10) configured to perform access control or another network entity of information on the change in the communication state. Note that although the AAA server 10 manages the additional addresses in the example of FIG. 4, if a network entity configured to perform access control exists in each service network, the actual address request/allocation is transferred to the service network (steps S1101, S1102), and changing of the address to be used is also done in the service network (step S1111). In addition, an instruction for address change is given inside the service network (step S1112). Thus, although messages and processing may differ depending on the arrangement of entities, the basic operation is the same, and the present invention can be implemented by changing parameters and the like within the scope of design.

In addition, in step S1112 in FIG. 4 described above, instead of notifying the service network (NW 1) 50a of the address change instruction, a notification on the address change instruction may be transmitted to any routing entity configured to transfer packets distributed by the service network (NW 1) to the communication terminal 40, and the routing entity having received the notification may change the destination address of the packet to the additional address.

As has been described, the amount of signaling can be reduced at the time of real-time access control for each communication terminal 40, each address, and each service. The communication terminal 40 can recognize the state of communication from a change such as transferring of a packet providing service to an alternative address, and thus can perform a corresponding operation. For example, since the communication terminal 40 can recognize a change in the size of a packet to be received or in the transmission rate, it is possible to take appropriate measures such as re-setting the reception buffer size or changing the setting of time until timeout.

<Second Embodiment>

Figure 6:
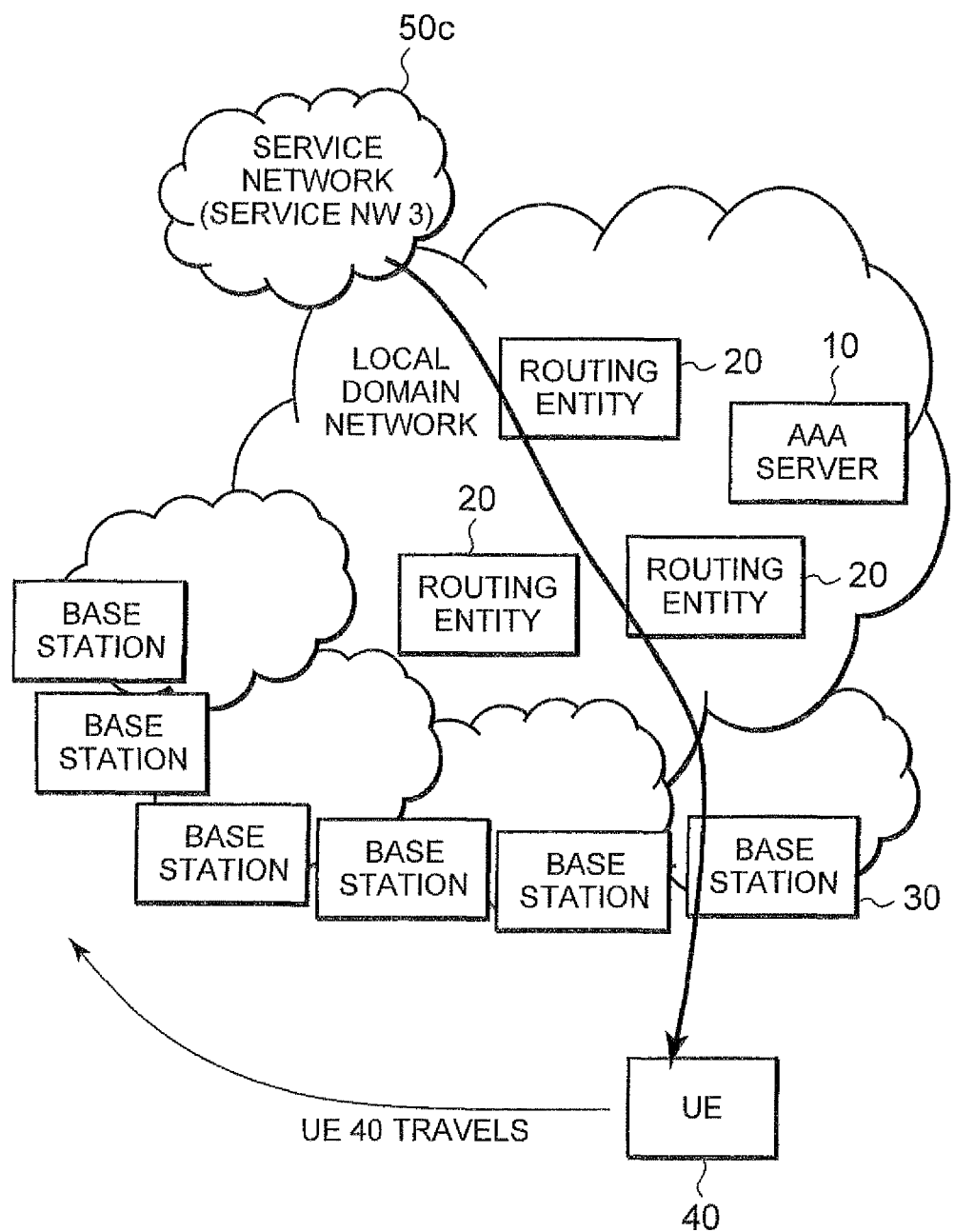
FIG. 6 A diagram showing an exemplary configuration of a network system in a second embodiment of the present invention.

Next, a second embodiment of the present invention will be described. Firstly, a description will be given of a configuration of a network system in the second embodiment of the present invention. FIG. 6 is a diagram showing an exemplary configuration of the network system in the second embodiment of the present invention.

The network configuration of FIG. 6 is basically the same as the network configuration shown in FIG. 1 (network configuration in the first embodiment of the present invention). To be specific, the network includes an entity (AAA server 10 in this example) configured to perform access control in a network (local network domain), multiple routing entities 20, and base stations 30 providing radio connection to a communication terminal 40. In addition, there are multiple service networks and the communication terminal 40 is capable of receiving a content distribution service from a service network (such as a service network (service NW 3) 50c).

Meanwhile, the communication terminal 40 connecting to the network side is a mobile communication terminal having a radio communication function. In the second embodiment of the present invention, the communication terminal 40 is capable of traveling while switching among connections with various base stations in a local network domain.

Note that configurations of the respective network entities (AAA server 10 and other routing entities) and the communication terminal 40 are basically the same as the configurations of the respective entities in the first embodiment of the present invention (configuration of AAA server 10 shown in FIG. 2, configuration of communication terminal 40 shown in FIG. 3). Note, however, that in addition to the first embodiment of the present invention, the second embodiment of the present invention enables the communication terminal 40 to switch the address to use, based on a change in the communication state caused by traveling of the communication terminal 40. Changes in the communication state caused by traveling of the communication terminal 40 include a change in the location of the communication terminal or in the location of its connection point (base station 30), a traveling speed of the communication terminal, whether or not the communication terminal 40 is connected to its base of connection, and so forth. For example, a communication terminal 40 can switch the address to use to an address suitable for the situation at the time, in a case where the communication terminal 40 changes the priority for communication because the connecting base station 30 (or connection area) changes or the traveling speed of the communication terminal 40 changes while traveling.

Moreover, when a communication terminal 40 of a certain user is given a default address, the default address itself may be subject to a limitation (if the limitation structure is a precondition, an address is not allocated unless downgrading is accepted, for example). In this case, too, the communication terminal 40 can switch its address to an address suitable for the communication state corresponding to the downgrade acceptance condition (such as limitations on the time period, area and the like).

(Operation when Communication Terminal 40 Travels)

Figure 7:
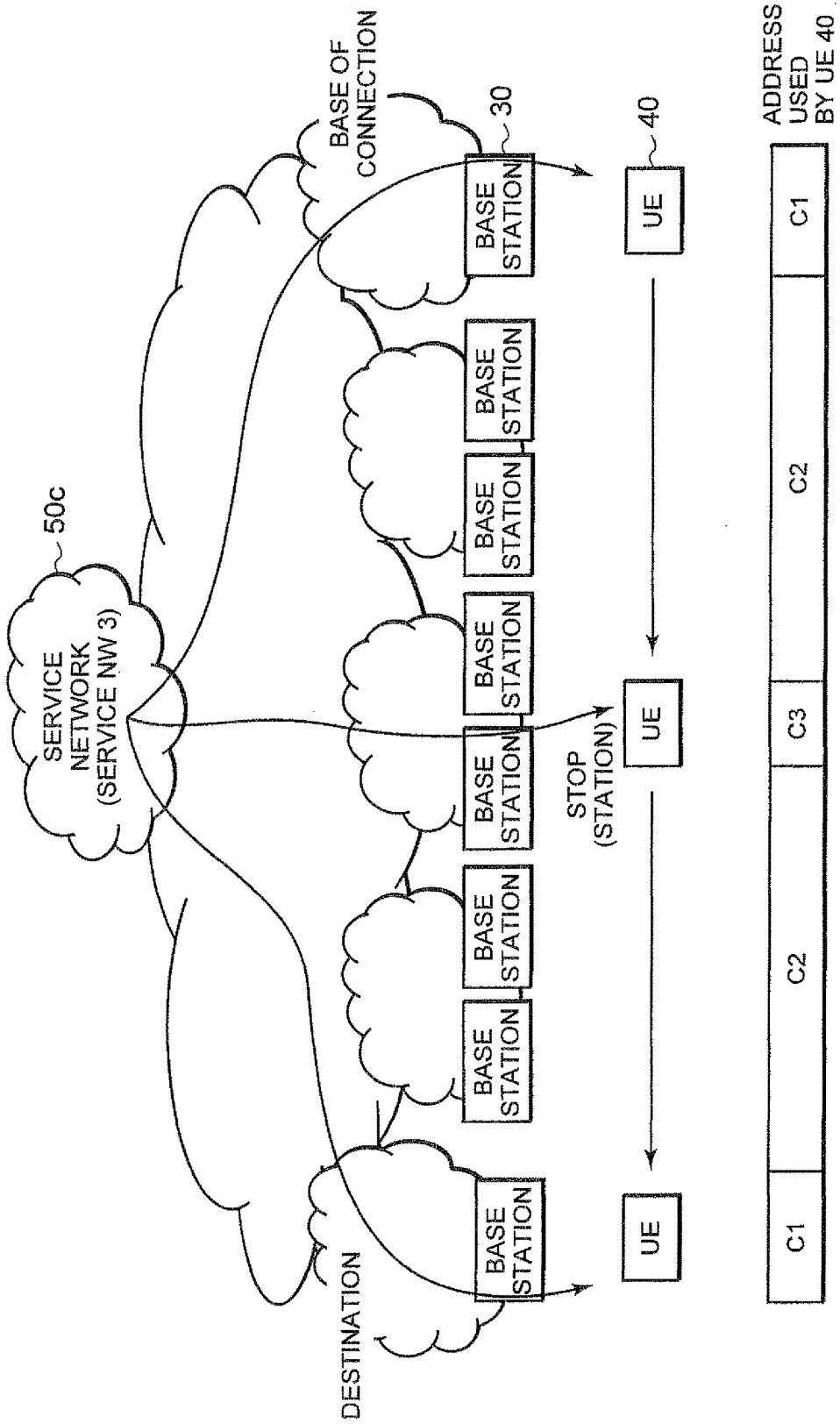
FIG. 7 A diagram showing an exemplary operation performed in the second embodiment of the present invention.
Figure 8:
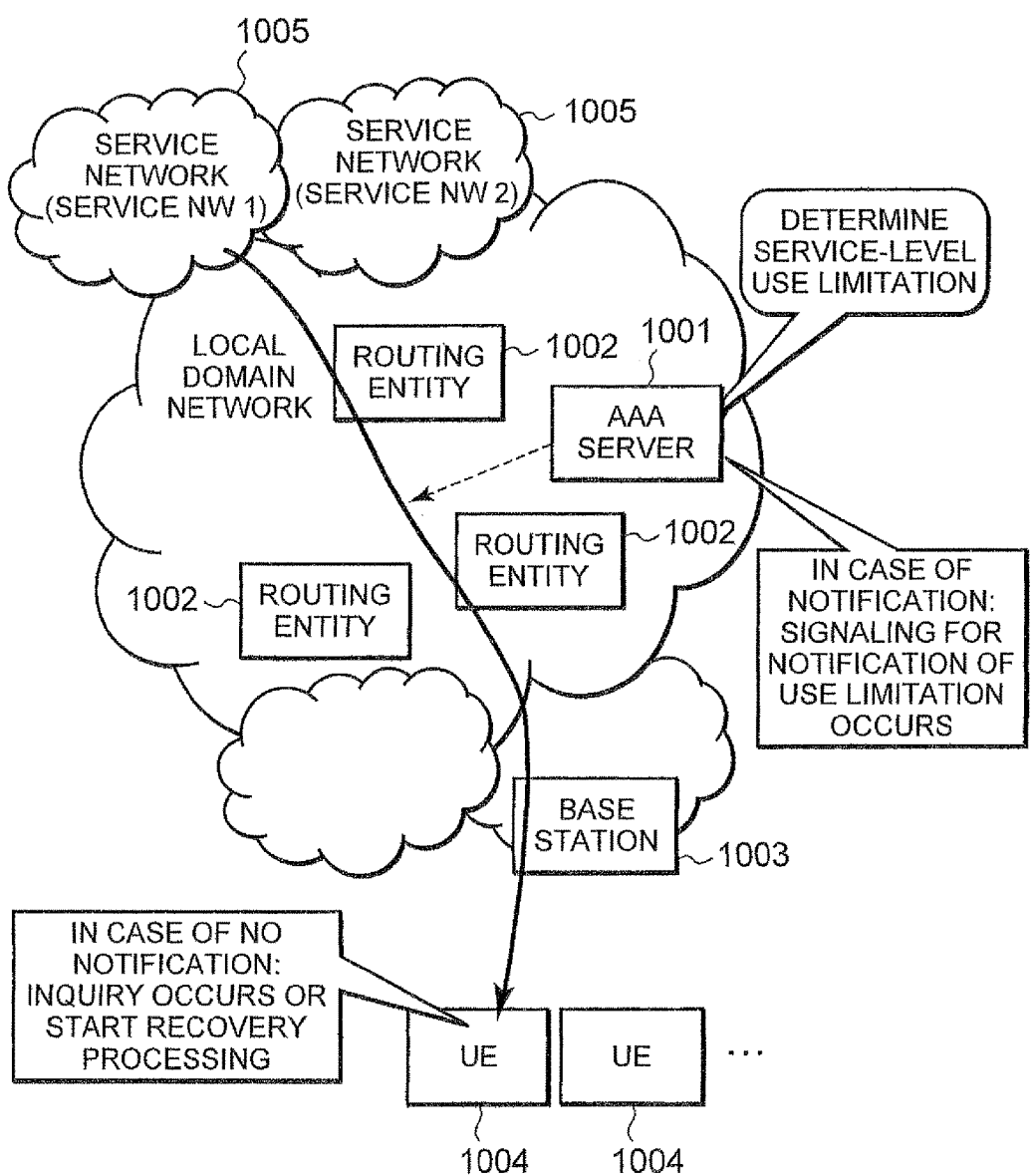
FIG. 8 A diagram showing an exemplary configuration of a network system for illustrating problems to be solved by the present invention.

Next, an operation performed in the second embodiment of the present invention will be described. FIG. 7 is a diagram showing an exemplary operation performed in the second embodiment of the present invention.

Sometimes, it is desirable to separately handle a communication terminal whose base of connection is its currently-connected access network and another communication terminal 40 (communication terminal 40 whose base of connection is another access network). A communication terminal whose base of connection is its currently-connected access network and another communication terminal 40 described above refer to: a communication terminal 40 connecting to its home operator and a communication terminal 40 in roaming which has connected to the network; a communication terminal 40 connecting to a local domain which is an origin and a communication terminal 40 having traveled to the local domain; and the like. Note that which of the former or the latter type of communication terminal is to be prioritized over the other is set as desired by a network policy.

Here, of addresses allocated to a certain communication terminal 40, an address used while the communication terminal 40 connects to an access network which is a base of connection is defined as an address C1, and an address used in other situations (while the communication terminal 40 does not connect to the access network which is the base of connection) is defined as an address C2. Note that correspondences between these addresses and their usages (service contents) are shared between the network entity (AAA server 10) configured to perform access control and the communication terminal 40, as in the case of the aforementioned first embodiment of the present invention.

For example, assume a case where the communication terminal 40 is owned by a user in a train who departs from an access network which is a base of connection (access network of a local company to which the user subscribes) or a small base station at home (such as access point or Home eNB) and travels to another destination. in this case, the communication terminal 40 of this user travels while switching among connections to access networks (base stations 30 under the access networks). Meanwhile, every time such a communication terminal 40 passes through, other communication terminals located around the travel path of this communication terminal 40 may experience unstable connection due to shortage in the network resources from allocating the network resources to the communication terminal 40 passing through. For this reason, in response to the change in situation (fact that the communication terminal 40 is traveling) caused by traveling of the communication terminal 40, the address to be used by the traveling communication terminal 40 is changed to the address for a case of not connecting to the access network which is the base of connection (address C2).

Specifically, in FIG. 7, for example, while connecting to the access network which is the base of connection, the communication terminal 40 receives contents from the service network by using the address C1. if the user of the communication terminal 40 starts traveling by car or train, for example, the address that has been used to receive contents from the service network is changed from the address C1 to the address C2, and the communication terminal 40 performs communication with the address C2 while traveling.

Note that the address to be used by the communication terminal 40 may be changed to the address C2 at the point of starting the travel, or may be changed to the address C2 at the point of leaving the access network which is the base of connection.

During use of the address C2, an upper limit is set for the communication band for packets transmitted from the service network (NW 3) 50c to the communication terminal 40, as long as the communication terminal 40 is connecting to the base station 30 located on its travel path. This can improve stability in connection of other communication terminals located around the travel path of the communication terminal 40 even when the communication terminal 40 is temporarily passing through, since the upper limit is set for the communication band for packets to be allocated to the passing communication terminal 40.

In addition, when the traveling communication terminal 40 stops at a specific place (stop such as a station), an access network covering this specific place may be set so that a communication band of the communication terminal 40 using the address C2 may be handled preferentially. This ensures stability in communication of the communication terminal 40 at specific places such as a station even though the access network covering the area is not a base of connection of the communication terminal 40. Note that in such a place, the address of the communication terminal 40 may be set back to the address C1 or an address C3 for the specific place (stop) may be used as shown in FIG. 7.

Moreover, when the communication terminal 40 returns to the access network which is the base of connection, the address to be used by the communication terminal 40 is preferably changed back to the address C1. Note that the communication terminal 40 may recognize, from an ID or the like of the base station 30, that the communication terminal 40 has returned to the access network which is the base of connection. Otherwise, a network entity may recognize this situation from location registration information or the like. In addition, if the communication terminal 40 visits a specific access network (state of arriving at the destination or leaving the train/station in the train example), its address may be changed from the address C2 back to the address C1. This allows the communication terminal 40 visiting the specific access network to be treated in the same manner as a communication terminal whose base of connection is this access network, and thus the communication terminal 40 visiting the specific access network is less influenced by other traveling communication terminals (communication terminals passing through the access network that the communication terminal 40 is visiting). Note that in such a place (access network that the communication terminal 40 is visiting), the communication terminal 40 may use another address C4 for a visitor.

It should be noted that as in the aforementioned first embodiment of the present invention, a change in the communication state (mainly a change in the communication state caused by traveling of the communication terminal 60 in the second embodiment of the present invention) that the network entity (AAA server 10) configured to perform access control refers to in determining the address change may be measured and detected by the network entity (AAA server 10) configured to perform access control by itself. Otherwise, the network entity (AAA server 10) configured to perform access control may acquire information on a change in the communication state which is measured and detected by another network entity. Moreover, the communication terminal 40 may measure and detect a change in the communication state and notify the network entity (AAA server 10) configured to perform access control or another network entity of information on the change in the communication state.

In addition, sometimes it is difficult for the network side to detect that the communication terminal 40 has arrived at its destination (detect that the current location is the destination), and thus it is preferable that a notification is made from the communication terminal 40 side. For example, the communication terminal 40 may make the notification by requesting (or using) the visitor address C4 as an additional address. Methods that the communication terminal 40 itself can use to detect the destination include user input, detection of passing a station gate, cooperation with a navigation system (location identification system) and the like. Alternatively, the communication terminal 40 may previously notify the network side of the destination so that the network side can detect the arrival of the communication terminal 40 at the destination.

The usages (service contents) corresponding to the addresses described in the aforementioned first and second embodiments of the present invention are an example, and various usages can be set in the present invention to suit an actual network operation. Moreover, in each of the addresses, different usages may be specified for the respective domains. For example, an address may be specified to be handled as a default address when used in a home domain while being handled as an additional address when used in other domains.

Although the aforementioned first and second embodiments of the present invention have been described for a case of allocating addresses to each communication terminal 40, the invention is also applicable to cases of allocating network prefixes, other IDs or the like. In other words, the present invention is also applicable to cases of using network prefixes, other IDs or the like as identification information for identifying each communication terminal 40.

For example, in PMIP, a unique network prefix is allocated to each communication terminal 40. Further, in a 3GPP network, there are cases where a communication terminal 40 has an ID, other than an IP address, for identifying the communication terminal 40 (or a provided service). Moreover, in an actual network operation, an IPv6 address system or art IPv4 address system (or a mixture of IPv4 and IPv6) is used. Moreover, the service system may be a packet switching (PS) system or a circuit switching (CS) system, and in this case, both the PS system address and the CS system address are used. The present invention is also applicable to such an environment by appropriately associating the addresses.

In a case where the communication terminal 40 makes an inquiry on the usage of an additional address (and also its corresponding default address) before using the additional address (or a case of being notified by the network side), a message used in AAA or a message used in handover (or fast handover) may be employed, or otherwise a message according to DHCP (Dynamic Host Configuration Protocol) or an RA (Router Advertisement) message may be employed.

A domain to which the communication terminal 40 connects may be any network such as a PMIPv6 domain, another 3GPP domain, different access networks such as WiMAX and WLAN, a network in which a radio system and a fixed line system are integrated by FMC (Fixed Mobile Convergence) or the like, or a network related to a highly managed network configuration such as NGN (Next Generation Network). Further, the credibility of a network to which the communication terminal 40 connects may be high or low.

Note that although the above embodiments describe a case of distinguishing services or the like by an IP address itself, it is also possible to use identification information associated to an IP address or identification information based on an IP address. For example, in a connection set to correspond to an IP address in a cellular network, additional identification information is used (corresponding to the procedure described for the IP address in the above embodiments) to identify a series of data flow and treat the data flow differently from another series of data flow. Thus, as similar to different addresses in a single service network, such identification information can be used as an index in a case of changing quality of service or a service content. The identification information for identifying a series of data flow is sometimes referred to as a flow label. Usually, multiple flow labels are added to a single IP address and used by being added (together with an IP address) to data so that pieces of data transmitted and received from and to a single IP address can be subjected to different processing. Note, however, that the identification information for identifying a series of data flow is in many cases only valid (uniquely identifiable) in a network which assigns the identifier, and thus use of the method employing the flow label or the like is limited to a specific service network or a specific operator network. In this case, different kinds of information may be employed for use outside the valid network (out of uniquely identifiable range) and use inside the specific range of network, i.e., a flow label may be used within the specific range and an IP address may be used elsewhere to distinguish the service contents of the present invention. This makes it possible both to achieve the main objective of the present invention and to suppress use of IP addresses (wasteful use of IP addresses, which are identifiers of a limited number, is generally undesirable).

Note that, further, according to the present invention, provided is a communication system configured such that:

pieces of identification information of a communication terminal are set to correspond to respective service contents of a plurality of different services;

the communication terminal knows a service content corresponding to a piece of identification information used by the communication terminal;

according to a service content of a service to be used by the communication terminal, a piece of identification information to be used by the communication terminal is selectively set from among the pieces of identification information corresponding to the service contents of the plurality of different services;

the service content of the service to be used by the communication terminal is determined according to a change in a communication state measurable on a network side; and the piece of identification information corresponding to the determined service content is set as the piece of identification information to be used by the communication terminal, and the communication system further configured such that:

the network side knows the change in the communication state measurable on the network side, the network side determines the service content of the service to be used by the communication terminal according to a change in a communication state measurable on the network side, and the piece of identification information corresponding to the determined service content is set as the piece of identification information to be used by the communication terminal.

Note that, further, according to the present invention, provided is a communication system configured such that:

pieces of identification information of a communication terminal are set to correspond to respective service contents of a plurality of different services;

the communication terminal knows a service content corresponding to a piece of identification information used by the communication terminal;

according to a service content of a service to be used by the communication terminal, a piece of identification information to be used by the communication terminal is selectively set from among the pieces of identification information corresponding to the service contents of the plurality of different services;

the service content of the service to be used by the communication terminal is determined according to a change in a communication state measurable on a network side; and the piece of identification information corresponding to the determined service content is set as the piece of identification information to be used by the communication terminal, and the communication system further configured such that:

the communication terminal knows the change in the communication state measurable on the network side, the communication terminal determines the service content of the service to be used by the communication terminal according to a change in a communication state measurable on the network side, and the piece of identification information corresponding to the determined service content is set as the piece of identification information to be used by the communication terminal.

Note that, further, according to the present invention, provided is a communication system configured such that:

pieces of identification information of a communication terminal are set to correspond to respective service contents of a plurality of different services;

the communication terminal knows a service content corresponding to each piece of identification information used by the communication terminal;

according to a service content of a service to be used by the communication terminal, a piece of identification information to be used by the communication terminal is selectively set from among the pieces of identification information corresponding to the service contents of the plurality of different services;

the service content of the service to be used by the communication terminal is determined according to a change in a communication state measurable on a network side; and the piece of identification information corresponding to the determined service content is set as the piece of identification information to be used by the communication terminal, and the communication system further configured such that:

the communication state measurable on the network side is one or both of the communication state in the network and the communication state variable by traveling of the communication terminal.

Note that, further, according to the present invention, provided is a communication system configured such that:

pieces of identification information of a communication terminal are set to correspond to respective service contents of a plurality of different services;

the communication terminal knows a service content corresponding to a piece of identification information used by the communication terminal;

according to a service content of a service to be used by the communication terminal, a piece of identification information to be used by the communication terminal is selectively set from among the pieces of identification information corresponding to the service contents of the plurality of different services;

the service content of the service to be used by the communication terminal is determined according to a change in a communication state measurable by the communication terminal; and the piece of identification information corresponding to the determined service content is set as the piece of identification information to be used by the communication terminal, and the communication system further configured such that:

the network side knows the change in the communication state measurable by the communication terminal, the network side determines the service content of the service to be used by the communication terminal according to a change in a communication state measurable by the communication terminal, and the piece of identification information corresponding to the determined service content is set as the piece of identification information to be used by the communication terminal.

Note that, further, according to the present invention, provided is a communication system configured such that:

pieces of identification information of a communication terminal are set to correspond to respective service contents of a plurality of different services;

the communication terminal knows a service content corresponding to a piece of identification information used by the communication terminal;

according to a service content of a service to be used by the communication terminal, a piece of identification information to be used by the communication terminal is selectively set from among the pieces of identification information corresponding to the service contents of the plurality of different services;

the service content of the service to be used by the communication terminal is determined according to a change in a communication state measurable by the communication terminal; and the piece of identification information corresponding to the determined service content is set as the piece of identification information to be used by the communication terminal, and the communication system further configured such that:

the communication terminal knows the change in the communication state measurable by the communication terminal, the communication terminal determines the service content of the service to be used by the communication terminal according to a change in a communication state measurable by the communication terminal, and the piece of identification information corresponding to the determined service content is set as the piece of identification information to be used by the communication terminal.

Note that, further, according to the present invention, provided is a communication system configured such that:

pieces of identification information of a communication terminal are set to correspond to respective service contents of a plurality of different services;

the communication terminal knows a service content corresponding to each piece of identification information used by the communication terminal;

according to a service content of a service to be used by the communication terminal, a piece of identification information to be used by the communication terminal is selectively set from among the pieces of identification information corresponding to the service contents of the plurality of different services;

the service content of the service to be used by the communication terminal is determined according to a change in a communication state measurable by the communication terminal; and the piece of identification information corresponding to the determined service content is set as the piece of identification information to be used by the communication terminal, and the communication system further configured such that:

the communication state measurable by the communication terminal is one or both of the communication state in the network and the communication state variable by traveling of the communication terminal.

Note that, further, according to the present invention, provided is a communication system configured such that:

pieces of identification information of a communication terminal are set to correspond to respective service contents of a plurality of different services;

the communication terminal knows a service content corresponding to a piece of identification information used by the communication terminal;

according to a service content of a service to be used by the communication terminal, a piece of identification information to be used by the communication terminal is selectively set from among the pieces of identification information corresponding to the service contents of the plurality of different services; and the service contents of the plurality of different services are classified by service types, and the communication system further configured such that:

the pieces of identification information classified by the service types of the services to be used by the communication terminal at least include first identification information for using a specific service, and second identification information for performing communication which is subjected to processing with a higher priority than communication for the specific service.

Note that, further, according to the present invention, provided is a communication system configured such that:

pieces of identification information of a communication terminal are set to correspond to respective service contents of a plurality of different services;

the communication terminal knows a service content corresponding to a piece of identification information used by the communication terminal;

according to a service content of a service to be used by the communication terminal, a piece of identification information to be used by the communication terminal is selectively set from among the pieces of identification information corresponding to the service contents of the plurality of different services; and the service contents of the plurality of different services are classified by service types, and the communication system further configured such that: communication subjected to processing with a higher priority than communication for the specific service is one or both of an inquiry or notification, and a service request in emergency.

Note that, further, according to the present invention, provided is a communication system configured such that:

pieces of identification information of a communication terminal are set to correspond to respective service contents of a plurality of different services;

the communication terminal knows a service content corresponding to a piece of identification information used by the communication terminal;

according to a service content of a service to be used by the communication terminal, a piece of identification information to be used by the communication terminal is selectively set from among the pieces of identification information corresponding to the service contents of the plurality of different services; and the service contents of the plurality of different services are classified by service qualities, and the communication system further configured such that:

the pieces of identification information classified by the service qualities of the services to be used by the communication terminal include at least one of first identification information for using a specific service, and second identification information for performing communication whose service quality is set lower than communication for the specific service, third identification information for performing communication whose service quality is set to be the same as the communication for the specific service, and fourth identification information for performing communication whose service quality is set higher than the communication for the specific service.

Further, in the present invention, one of the network side communication device and the communication terminal may include means for detecting a change in the communication state.

Further, in the present invention, the communication terminal may be configured to be movable by including a radio communication function for connecting to a network.

Note that each of the functional blocks used in the above description of the embodiments of the present invention is typically realized as an LSI (Large Scale Integration) which is an integrated circuit. The functional blocks may be individually implemented as chips, or may be implemented as a chip including a part or all of the functions. Note that although the integrated circuit is referred to here as an LSI, it may be referred to as IC (integrated circuit), system LSI, super LSI, or ultra LSI, depending on the degree of integration.

Moreover, the method of creating an integrated circuit is not limited to the LSI, and may be realized by a dedicated circuit or a general processor. An FPGA (field programmable gate array) which is programmable after manufacturing of an LSI, or a reconfigurable processor in which connections in circuit cells inside an LSI and settings are reconfigurable can also be used.

Furthermore, if a technique for creating an integrated circuit appears in place of the LSI due to progress in the semiconductor technology or by another technology derived therefrom, the functional blocks may be integrated by use of the technique, as a matter of course. For example, application of biotechnology is conceivable.

INDUSTRIAL APPLICABILITY

The present invention has an effect of performing flexible service-level access control in real-time while suppressing occurrence of signaling, is applicable to a communication technique used in a packet-switched data communication network, and particularly to a communication technique for controlling service-level (phase of receiving actual service after connecting to a network) access by a communication terminal.

The invention claimed is:

1. A communication system comprising:
   a communication terminal configured to connect to a network; and
   a network side communication device configured to perform access control of the communication terminal, wherein:
   the network side communication device includes
      an information holding unit configured to hold pieces of correspondence information between respective service contents of a plurality of different services and pieces of identification information of the communication terminal, the pieces of identification information being a plurality of addresses allocated to the communication terminal connecting via a single communication link with the network, the plurality of addresses including a default address and an additional address which is associated with the default address, and the default address and the additional address corresponding to the service contents respectively, both a communication to the default address and a communication to the additional address being sent via the single communication link,
      an identification information processor configured to determine a service content of a service to be used by the communication terminal, and to set a piece of identification information to be used by the communication terminal from among the pieces of identification information corresponding to the determined service content by referring to the pieces of correspondence information; and
   the communication terminal includes an information holding unit configured to hold the piece of correspondence information notified by the network side communication device,
   the service content of the service to be used by the communication terminal is changed when the network side communication device selects the address among the default address and the additional address,
the default address is a main address for normal use and the additional address is an alternative address, and
the service content corresponding to the additional address is accompanied with the service content corresponding to the default address.

2. The communication system according to claim 1, wherein the identification information processor determines the service content of the service to be used by the communication terminal according to a change in a communication state measured by the network side communication device.

3. The communication system according to claim 1, wherein the identification information processor determines the service content of the service to be used by the communication terminal according to a change in a communication state measured by any entity in the network or the communication terminal.

4. The communication system according to claim 1, being configured so that the service contents of the plurality of different services are classified by service types.

5. The communication system according to claim 1, being configured so that the service contents of the plurality of different services are classified by service qualities.

6. The communication system according to claim 1, wherein
the network side communication device further includes a notification unit configured to notify the communication terminal of a service content of a service corresponding to the piece of identification information as well as the piece of identification information, and
the communication terminal is configured to be capable of acquiring the piece of correspondence information, by further including an acquisition unit configured to receive the service content and the piece of identification information.

7. The communication system according to claim 6, wherein the communication terminal is configured to be capable of acquiring the piece of correspondence information, by further including an information request unit configured to make an inquiry to the network side communication device on a service content of a service corresponding to the piece of identification information held in the information holding unit included in the communication terminal.

8. The communication system according to claim 1, wherein the communication terminal acquires the additional address simultaneously with acquisition of the default address after completing authentication for network access.

9. A communication method comprising the steps of:
setting pieces of identification information of a communication terminal to correspond to respective service contents of a plurality of different services, the pieces of identification information being a plurality of addresses allocated to the communication terminal connecting via a single communication link with the network, the plurality of addresses including a default address and an additional address which is associated with the default address, and the default address and the additional address corresponding to the service contents respectively, both a communication to the default address and a communication to the additional address being sent via the single communication link;
knowing, by the communication terminal, a service content corresponding to a piece of identification information used by the communication terminal; and
selectively setting a piece of identification information to be used by the communication terminal from among the pieces of identification information corresponding to the service contents of the plurality of different services, according to a service content of a service to be used by the communication terminal,
wherein:
the service content of the service to be used by the communication terminal is changed when a network side communication device installed in the network selects the address among the default address and the additional address, the network side communication device being configured to perform access control of the communication terminal,
the default address is a main address for normal use and the additional address is an alternative address, and
the service content corresponding to the additional address is accompanied with the service content corresponding to the default address.

10. The communication method according to claim 9, further comprising the steps of:
determining the service content of the service to be used by the communication terminal according to a change in a communication state measurable on a network side, and
setting a piece of identification information corresponding to the determined service content as the piece of identification information to be used by the communication terminal.

11. The communication method according to claim 9, further comprising the steps of:
determining the service content of the service to be used by the communication terminal according to a change in a communication state measurable by the communication terminal, and
setting a piece of identification information corresponding to the determined service content as the piece of identification information to he used by the communication terminal.

12. The communication method according to claim 9 wherein the service contents of the plurality of different services are classified by service types.

13. The communication method according to claim 9, wherein the service contents of the plurality of different services are classified by service qualities.

14. The communication method according to claim 9, further comprising a step of notifying, by the network side, the communication terminal of a service content of a service corresponding to the piece of identification information in allocation of the piece of identification information to the communication terminal by the network side, so that the communication terminal knows the service content corresponding to the piece of identification information to be used by the communication terminal.

15. The communication method according to claim 9, further comprising the steps of:
making, by the communication terminal, an inquiry on a service content of a service corresponding to a piece of identification information held by the communication terminal, and
notifying, by the network side, the communication terminal of the service content of the service corresponding to the piece of identification information in response to the inquiry, so that the communication terminal knows the service content corresponding to the piece of identification information to be used by the communication terminal.

16. A network side communication device installed in a network to which a communication terminal is connectable, the network side communication device comprising:
- a holding unit configured to hold pieces of correspondence information between pieces of identification information of the communication terminal and respective service contents of a plurality of different services, the pieces of identification information being a plurality of addresses allocated to the communication terminal connecting via a single communication link with the network, the plurality of addresses including a default address and an additional address which is associated with the default address, and the default address and the additional address corresponding to the service contents respectively, both a communication to the default address and a communication to the additional address being sent via the single communication link; and
- a change unit configured to refer to the pieces of correspondence information to Change a piece of identification information used by the communication terminal to a piece of identification information corresponding to a service content of a service which is to be used by the communication terminal and determined according to a change in a communication state, wherein:
- the service content of the service to be used by the communication terminal is changed when the network side communication device selects the address among the default address and the additional address,
- the default address is a main address for normal use and the additional address is an alternative address, and
- the service content corresponding to the additional address is accompanied with the service content corresponding to the default address.

17. The network side communication device according to claim 16, comprising a determination unit configured to determine the service content of the service to be used by the communication terminal according to the change in the communication state.

18. The network side communication device according to claim 16, comprising a setting unit configured to set each correspondence between a service content of a service to be used by the communication terminal and a piece of identification information of the communication terminal.

19. The network side communication device according to claim 16, comprising a notification unit configured to notify the communication terminal of the piece of identification information of the communication terminal and a service content of a service corresponding to the piece of identification information.

20. A communication terminal connectable to a network comprising:
- a holding unit configured to hold pieces of correspondence information between pieces of identification information of the communication terminal and respective service contents of a plurality of different services, the pieces of identification information being a plurality of addresses allocated to the communication terminal connecting via a single communication link with the network, the plurality of addresses including a default address and an additional address which is associated with the default address, and the default address and the additional address corresponding to the service contents respectively, both a communication to the default address and a communication to the additional address being sent via the single communication link; and
- a change unit configured to change a piece of identification information used by the communication terminal to a piece of identification infoiniation corresponding to a service content of a service which is to be used by the communication terminal and determined according to a change in a communication state, wherein:
- the service content of the service to be used by the communication terminal is changed when a network side communication device installed in the network selects the address among the default address and the additional address, the network side communication device being configured to perform access control of the communication terminal
- the default address is a main address for normal use and the additional address is an alternative address, and
- the service content corresponding to the additional address is accompanied with the service content corresponding to the default address.

21. The communication terminal according to claim 20, comprising a receiving unit configured to receive, from the network, the piece of identification information of the communication terminal and a service content of a service corresponding to the piece of identification information.

22. The communication en Mai according to claim 20, further comprising a request unit configured to make a request to the network for the piece of identification information of the communication terminal and a service content of a service corresponding to the piece of identification information.

* * * * *